United States Patent
Chen et al.

(10) Patent No.: US 9,642,198 B2
(45) Date of Patent: May 2, 2017

(54) THREE-WAY OMNI-DIRECTIONAL LED LAMP DRIVER CIRCUIT

(71) Applicant: Technical Consumer Products, Inc., Aurora, OH (US)

(72) Inventors: Timothy Chen, Aurora, OH (US); Daniel Haas, Rootstown, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 724 days.

(21) Appl. No.: 13/866,558

(22) Filed: Apr. 19, 2013

(65) Prior Publication Data

US 2014/0312794 A1    Oct. 23, 2014

(51) Int. Cl.
 *H05B 37/02* (2006.01)
 *H05B 33/08* (2006.01)

(52) U.S. Cl.
 CPC ..... *H05B 33/0815* (2013.01); *H05B 33/0845* (2013.01)

(58) Field of Classification Search
 CPC ............ H05B 33/0815; H05B 33/0845; H05B 33/0884; H05B 37/02; H05B 37/0281; Y02B 20/40; Y02B 20/346
 USPC .... 315/193, 187, 291, 295, 307, 297, 200 R
 See application file for complete search history.

(56) References Cited

U.S. PATENT DOCUMENTS

| | | | |
|---|---|---|---|
| 3,961,208 A * | 6/1976 | Khanna | 327/513 |
| 8,198,819 B2 | 6/2012 | Lenk | |
| 8,816,594 B2 | 8/2014 | Lenk | |
| 2002/0117975 A1 * | 8/2002 | Yang | H05B 33/0809 315/291 |
| 2007/0262654 A1 | 11/2007 | Mosebrook et al. | |
| 2008/0018261 A1 | 1/2008 | Kastner | |
| 2009/0039854 A1 | 2/2009 | Blakeley | |
| 2010/0090609 A1 * | 4/2010 | Lenk | H05B 33/0845 315/201 |
| 2010/0231136 A1 * | 9/2010 | Reisenauer | H05B 33/0848 315/276 |
| 2011/0121752 A1 * | 5/2011 | Newman et al. | 315/291 |
| 2011/0215731 A1 * | 9/2011 | Jeong et al. | 315/254 |
| 2012/0146538 A1 | 6/2012 | Nerone | |
| 2012/0206056 A1 | 8/2012 | Jung et al. | |

(Continued)

OTHER PUBLICATIONS

PCT, International Search Report and Written Opinion, PCT/US2014/034613 (Aug. 22, 2014).

*Primary Examiner* — Jimmy Vu
*Assistant Examiner* — Henry Luong
(74) *Attorney, Agent, or Firm* — Thompson Hine LLP (57) ABSTRACT

An LED driver circuit has a rectifier circuit including a first input terminal coupled to a first AC voltage line and a second input terminal coupled to a second AC voltage line. The rectifier circuit is configured to convert a first AC voltage on the first AC voltage line and a second AC voltage on the second AC voltage line to a DC voltage. The driver circuit has a switching circuit coupled to the first AC voltage line and to the second AC voltage line and configured to generate a reference AC voltage based on the first AC voltage and the second AC voltage. The driver circuit has a power management circuit configured to provide a current or power to an LED lamp based on the generated AC reference voltage. The driver circuit has a power supply circuit configured to provide a constant current or power to the power management circuit.

10 Claims, 6 Drawing Sheets

(56) References Cited

U.S. PATENT DOCUMENTS

2013/0334980 A1* 12/2013 Zhou et al. ............... 315/250
2014/0152187 A1* 6/2014 Lin ................. H05B 33/0815
                                                    315/200 R
2014/0327368 A1    11/2014 Lenk

* cited by examiner

THREE-WAY OMNI-DIRECTIONAL LED LAMP DRIVER CIRCUIT

FIELD OF DISCLOSURE

The present disclosure relates to the field of LED lamps. More particularly, the present disclosure relates to a driver circuit for a three-way omni-directional LED lamp.

BACKGROUND

A three-way lighting fixture using a three-way incandescent bulb produces light at one of three levels, low, medium, or high, depending on a position of a three-way switch. The three way switch has three contacts for receiving three lines or wires, two being live voltage lines and on being a neutral line. Depending on a position of the switch, either one, both, or none of the live wires will conduct electricity. The incandescent bulb has two independent filaments, each coupled to the two live voltage lines, respectively. When the first voltage line is conducting and the second voltage line is not conducting, a first filament receives current and therefore the incandescent bulb produces a light at a low level. When the second voltage line is conducting and first voltage line is not conducting, a second filament receives current and therefore the incandescent bulb produces a light at a medium level. Finally, when both voltage lines are conducting, both filaments receive current and therefore the incandescent bulb produces light at a high level.

LED light sources are more efficient and have longer life spans as compared to incandescent bulbs. Thus, it is desirable to retrofit LED light bulbs to work with existing incandescent lighting fixtures so that incandescent bulbs may be substituted with LED light bulbs. LED light bulbs, however, do not use filaments to produce light. Rather, LED light bulbs utilize light emitting diodes (LEDs) to produce light. Multiple LEDs may be packaged into an LED assembly in order to generate a desired lighting level when the LED assembly receives current from a power source. In order to retrofit an LED light bulb to function with a three-way switch of a three-way lighting fixture, an LED light bulb may be designed to include a second LED assembly. Thus, the two LED assemblies of an LED light bulb may function similarly to the two filaments of an incandescent bulb and produce three different levels of light depending on the position of the three-way switch. Including two independent LED assemblies in an LED light bulb, however, may not be economical since such an LED light bulb would require twice the amount of components. In addition, an LED light bulb including two LED assemblies may require a form factor having a size or shape which may not be desirable.

SUMMARY OF THE DISCLOSURE

An LED driver circuit has a rectifier circuit including a first input terminal coupled to a first AC voltage line and a second input terminal coupled to a second AC voltage line. The rectifier circuit is configured to convert a first AC voltage on the first AC voltage line and a second AC voltage on the second AC voltage line to a DC voltage. The LED driver circuit has a switching circuit coupled to the first AC voltage line and to the second AC voltage line and configured to generate a reference AC voltage based on the first AC voltage and the second AC voltage. The LED driver circuit has a power management circuit configured to provide a current to an LED lamp based on the generated AC reference voltage. The LED driver circuit has a power supply circuit configured to receive the DC voltage and to provide a constant power supply to the power management circuit.

A three-way LED lamp, including an LED and an LED driver circuit. The LED driver circuit includes a three-way rectifier circuit coupled to a neutral line, a first AC voltage line, and a second AC voltage line, and is configured to generate a DC voltage output. The LED driver circuit includes a switching circuit coupled to the first AC voltage line and to the second AC voltage line and configured to switch to one of a first AC reference voltage, a second AC reference voltage, and a third AC reference voltage, based on a conducting state of the first voltage line and the second voltage line. The LED driver circuit includes a power management circuit configured to provide a current to the LED based on an AC reference voltage selected by the switching circuit. The LED driver circuit includes a power supply circuit configured to receive the DC voltage output and to provide a constant current to the power management circuit.

BRIEF DESCRIPTION OF THE DRAWINGS

In the accompanying drawings, structures are illustrated that, together with the detailed description provided below, describe exemplary aspects of the present teachings. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
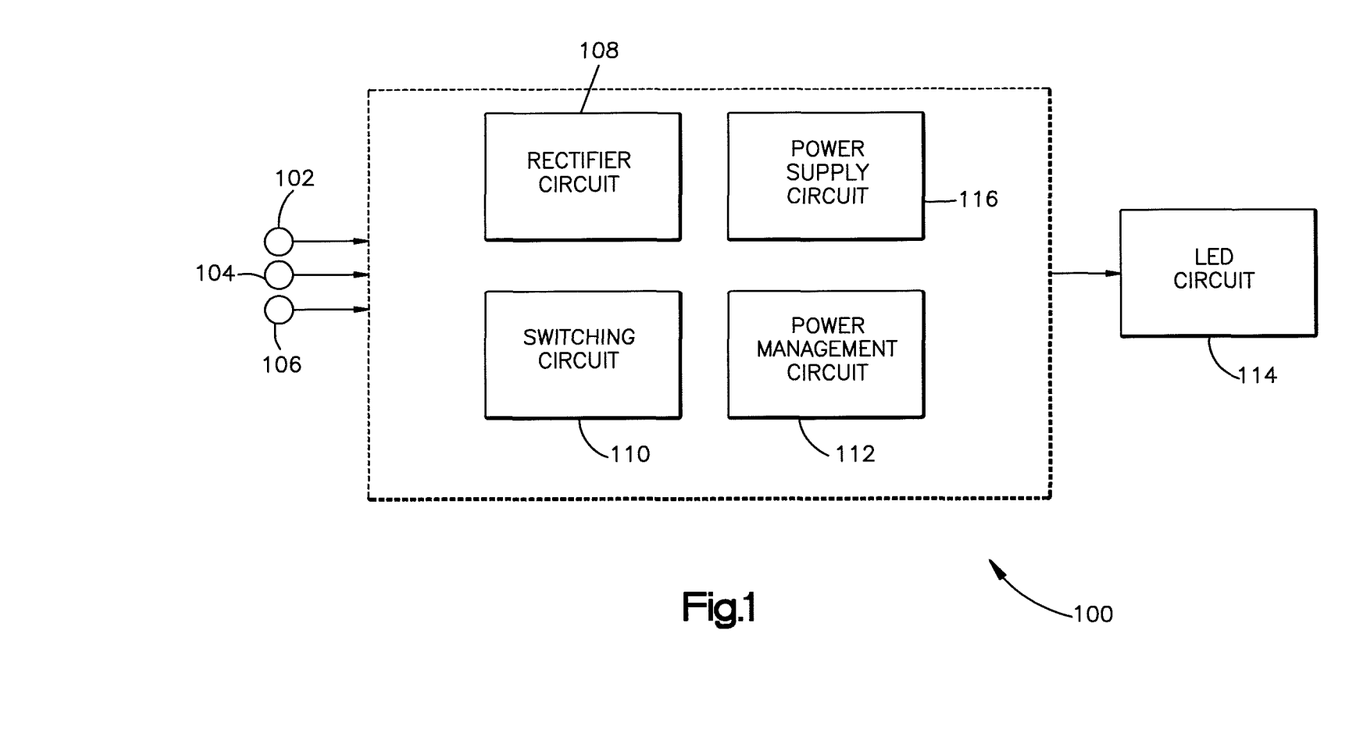
FIG. 1 illustrates an example driver circuit for a three-way omni-directional LED lamp.

FIG. 1 illustrates an example driver circuit 100 for driving a three-way omni-directional LED lamp. Driver circuit 100 is coupled to three input lines: a first AC voltage line 102, a second AC voltage line 104, and a neutral line 106. First AC voltage line 102, second AC voltage line 104, and neutral line 106 may be coupled to a three-way switch (not shown) for controlling when first AC voltage 102 and second AC voltage line 104 are in a conducting state. In other words, first AC voltage line 102 and second AC voltage line 104 may each be selectively controlled to be either on or off.

Driver circuit 100 includes a rectifier circuit 108 for converting AC voltage on first AC voltage line 102 and on second AC voltage line 104 to DC voltage. In one example, rectifier circuit 108 is a combination of three half-bridge diode circuits in parallel.

Driver circuit 100 includes a switching circuit 110 that generates a reference voltage based on first AC voltage line 102 and second AC voltage line 104. Specifically, switching circuit 110 switches to one of a first AC reference voltage, a second AC reference voltage, and a third AC reference voltage, based on a conducting state of first AC voltage line 102 and second AC voltage line 104. For example, switching circuit 110 switches to a first AC reference voltage when first AC voltage line 102 is on or conducting and second AC voltage line 104 is on or conducting; switching circuit 110 switches to a second AC reference voltage when first AC voltage line 102 is on or conducting and second AC voltage line 104 is off or not conducting; and switching circuit 110 switches to a third AC reference voltage when first AC voltage line 102 is off or not conducting and second AC voltage line 104 is on or conducting.

In one example, the first reference voltage is a low voltage, the second reference voltage is a medium voltage, and the third reference voltage is a high voltage. In one example, the second reference voltage may be twice the voltage of the first reference voltage and the third reference voltage may be three-times the reference voltage of the first reference voltage.

In one example, switching circuit 110 and power management circuit 112 may be combined into a single integrated circuit which includes the functionality of both as described.

Driver circuit 100 includes a power management circuit 112 that provides a current to an LED circuit 114 based on the generated AC reference voltage. For example, power management circuit 112 may provide LED circuit 114 with a maximum power level when switching circuit 110 generates the third reference voltage, power management circuit 112 may provide LED circuit 114 with two thirds of a maximum power level when switching circuit 110 generates the second reference voltage, and power management circuit 112 may provide LED circuit 114 with one third of a maximum power level when switching circuit 110 generates the first reference voltage. A maximum power level may defined as the current required to LED circuit 114 in order to reach full brightness. Thus, depending on the reference voltage generated, LED circuit 114 may be controlled to light up at a low level, a medium level, or a high level.

Driver circuit 100 includes a power supply circuit 116 for receiving the DC voltage from rectifier circuit 108 and for providing a constant current, or power supply, to power management circuit 112, or to LED circuit 114. As described, first AC voltage line 102 and second AC voltage line 104 received by rectifier circuit 108 may be selectively controlled to be either on or off. However, regardless of whether first AC voltage line 102 is on, second AC voltage line 104 is on, or both are on, power supply circuit 116 ensures that a constant voltage is being supplied to power management circuit 112 regardless of the conducting states of first AC voltage line 102 and second AC voltage line 104.

In one example, power supply circuit 116 maintains a constant current by adjusting an internal impedance, based on the DC output voltage of rectifier circuit 108. For example, as the DC output voltage increases, power supply circuit 116 increases internal impedance in order to maintain constant voltage output. In another example, power supply circuit 116 maintains a constant current by adjusting a switching on time or off time based on the DC voltage.

Figure 2:
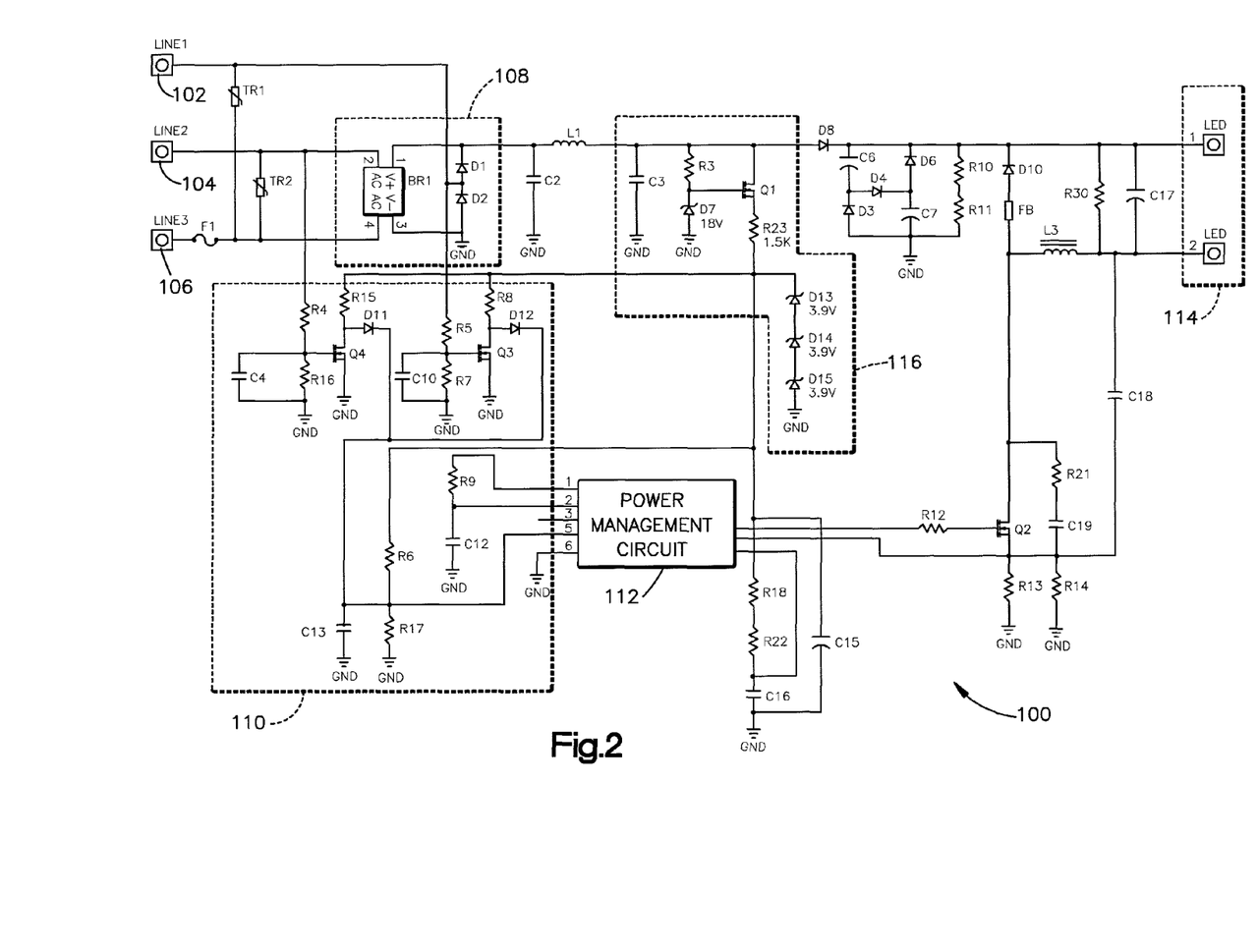
FIG. 2 illustrates an example driver circuit for a three-way omni-directional LED lamp.

FIG. 2 illustrates the example implementation of driver circuit 100 of FIG. 1, including rectifier circuit 108, switching circuit 110, power management circuit 112, LED circuit 114, and power supply circuit 116. In addition to providing power to LED circuit 114, power management circuit 112 senses current at LED circuit 114 and compares the sensed current to the reference voltage generated by switching circuit 110. Power management circuit 112 adjusts current supplied to LED circuit 114 accordingly to ensure a constant current supply based on the reference voltage. Power management circuit 112 can be an integrated circuit such as an LM3445 manufactured by Texas Instruments or any other suitable circuit capable of comparing a sensed current to a reference current and supplying a constant current based on the reference voltage.

Figure 3:
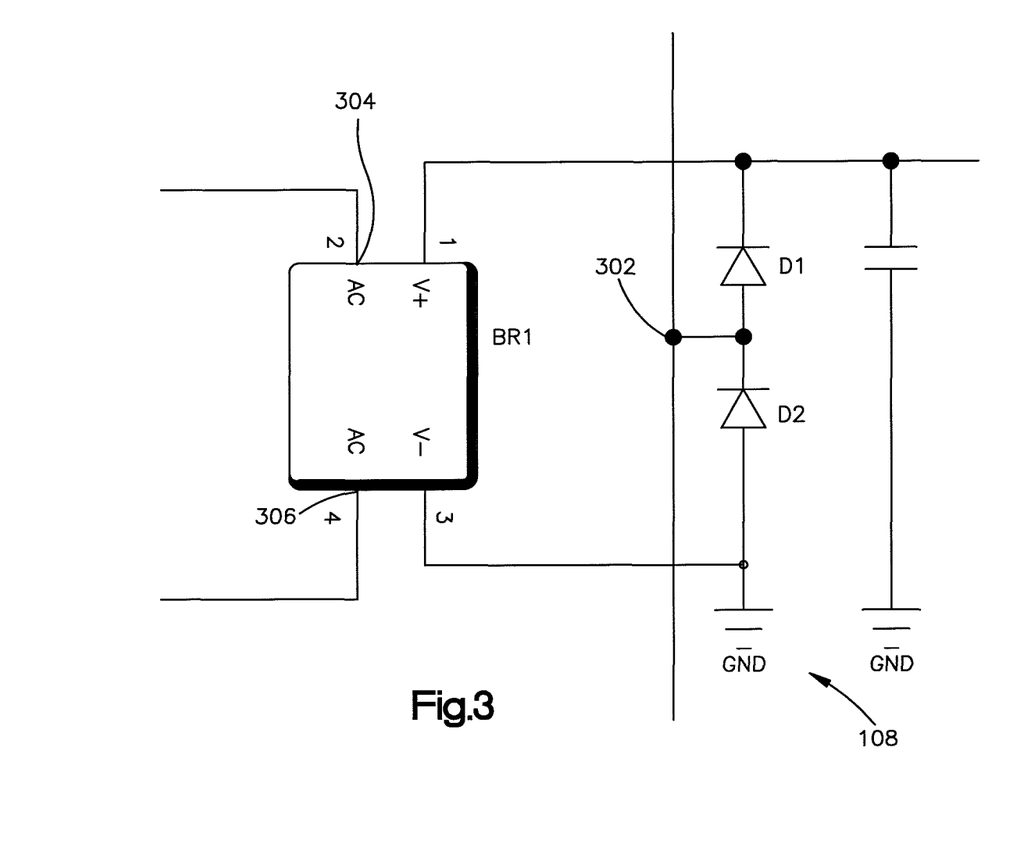
FIG. 3 is an example rectifier circuit as illustrated in FIG. 2.

FIG. 3 is a close-up view of rectifier circuit 108 of FIG. 2. Rectifier circuit 108 includes a first input terminal 302 coupled to first AC voltage line 102 and a second input terminal 304 coupled to second AC voltage line 104. Rectifier circuit also includes a third input terminal 306 coupled to neutral line 106.

In one example, rectifier circuit 108 is a combination of three half bridge diode circuits in parallel. For example, rectifier circuit 108 includes a first four bridge diode circuit BR1 (or two half bridge diode circuits). BR1 is connected in parallel to diodes D2 and D6, which are connected in series, to form the third half bridge diode circuit.

Figure 4:
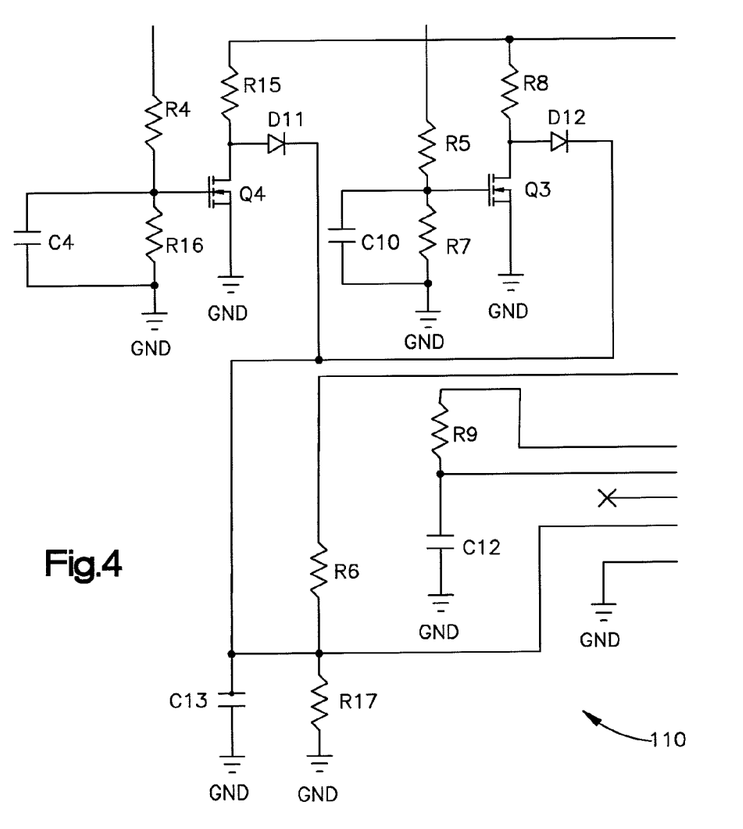
FIG. 4 is and example switching circuit as illustrated in FIG. 2.

Referring back to FIG. 2, switching circuit 110 is coupled to first AC voltage line 102 and to second AC voltage line 104. FIG. 4 is a close-up view of switching circuit 110 of FIG. 2. Switching circuit 110 includes switch Q3 and Q4 coupled to first AC voltage line 102 and second AC voltage line 104 respectively. Q3 and Q4 are switched on and off according to whether first AC voltage line 102 and second AC voltage line 104 are in a conducting state or not. The position of switches Q3 and Q4, in turn, determine the reference voltage selected by switching circuit 110.

Specifically, when Q3 or Q4 are both switched off, meaning that neither first AC voltage line 102 or second voltage line 104 are conducting current, switching circuit is not conducting any current either and therefore does not produce a reference voltage. When both first AC voltage line 102 and second AC voltage line 104 are conducting, both Q3 and Q4 are switched on, thereby turning off, or grounding, resistors R15 and R8 and thereby producing a first reference voltage at one-third of full capacity. When first AC voltage line 102 is conducting and second AC voltage line is not conducting, Q3 is on and Q4 is off. This turns off resistor R15 and turns on resistor R8, and thereby produces a second reference voltage at two-thirds of full capacity. When first AC voltage line 102 is not conducting and second AC voltage line 104 is conducting, Q3 is off and Q4 is on. This turns off resistor R8 and turns on resistor R15, and thereby produces a third reference voltage at full capacity.

Figure 5:
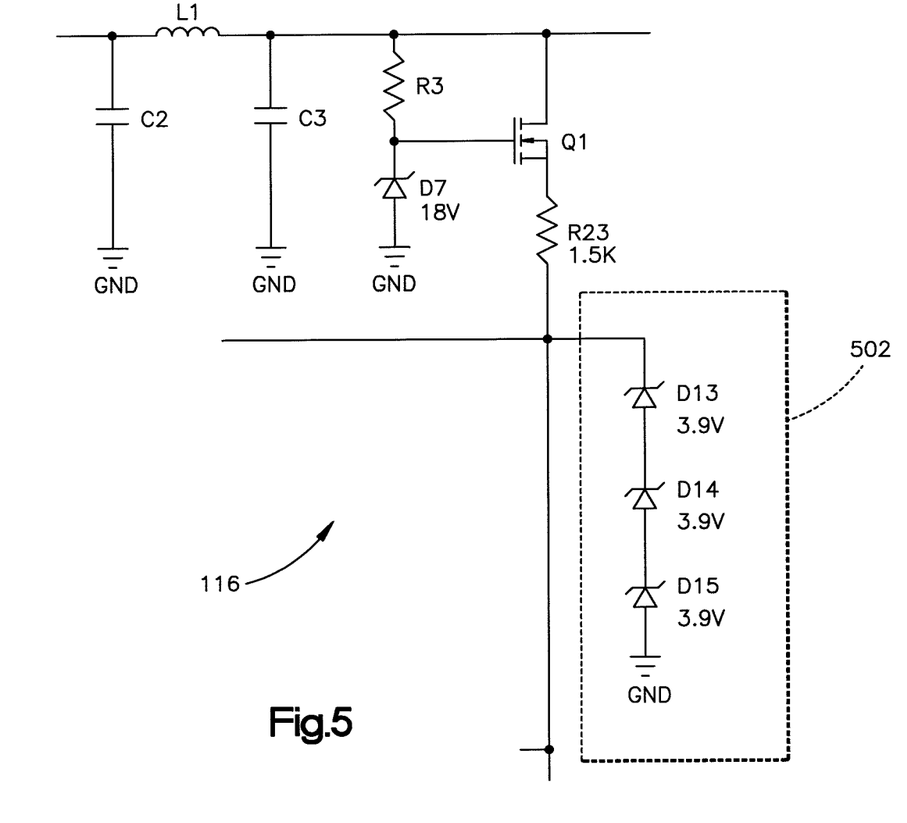
FIG. 5 is an example power supply circuit as illustrated in FIG. 2.

FIG. 5 is a close-up view of power supply circuit 116 of FIG. 2. Power supply circuit 116 has current adjust circuit including a switch Q1 connected in parallel with diode D7. Switch Q1, in combination with diode D7, ensures a constant voltage output by regulating the impendence using a selective combination of resistors R3 and Zener Diode D7.

In one example, power supply circuit 116 includes a diode stack 502 including a first zener diode D13, a second zener diode D14, and a third zener diode D15. First zener diode D13, second zener diode D14, and third zener diode D15 are connected in series and configured to clamp voltage and to prevent the power supplied to the power management circuit 112 from increasing in response to an increase in temperature. In one example, first zener diode D13, second zener diode D14, and third zener diode D15 are negative characteristic diodes rated at less than five volts.

Figure 6:
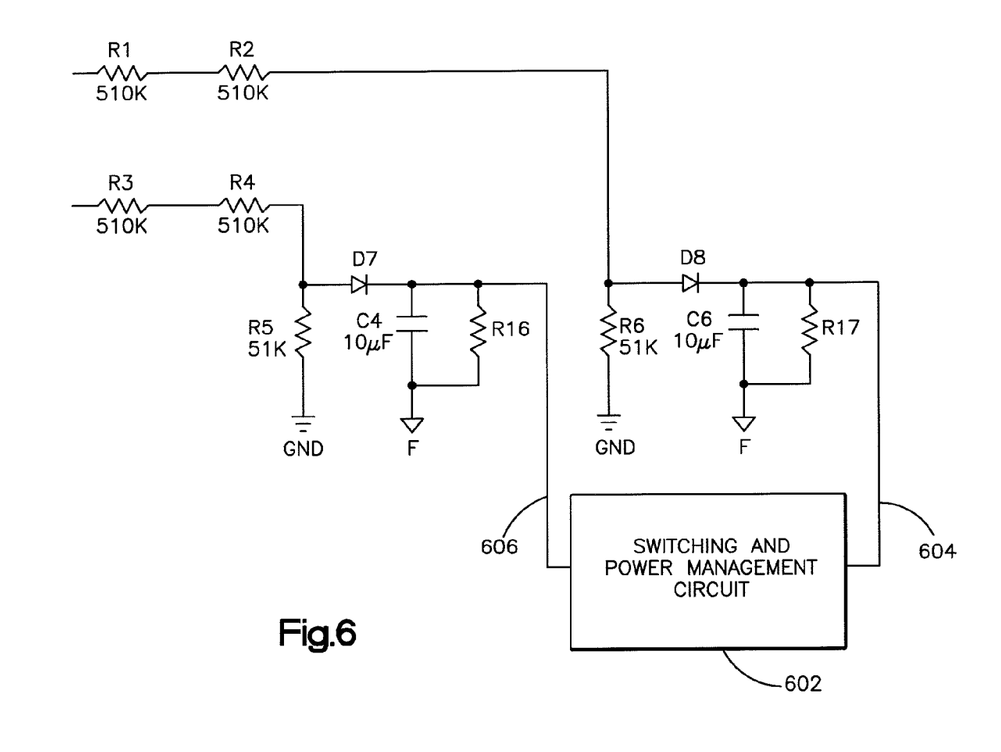
FIG. 6 is an alternate embodiment of a switching circuit.

FIG. 6 illustrates and alternate embodiment of a switching circuit 110 in which the functionality of switching circuit 110 and power management circuit 112 may be combined into a single floating integrated circuit 602. Floating integrated circuit 602 is configured to be coupled to two input lines 604 and 606, which are in turn associated with first AC voltage line 102 and second AC voltage line 104 respectively.

In addition to being able to compare a sensed current to a reference voltage and to adjust supplied current to LED circuit 114 accordingly, floating integrated circuit 602 is also configured to detect two whether input lines 604 and 606 are on or off respectively and to generate a reference voltage accordingly. For example, when first AC voltage line 102 and second AC voltage line 104 are conducting, and when floating ground (F) is on the GND level diodes D7 and D8 are both conducting and therefore voltage on resistors R5 and R6 are transfer to input lines 604 and 606, and the floating integrated circuit 602 generates a first reference voltage. When only first AC voltage line 102 is conducting, floating integrated circuit 602 generates a second reference voltage. When only second AC voltage line 104 is conducting, floating integrated circuit 602 generates a third reference voltage. Floating integrated circuit 602 uses the generated reference voltage to compare to a sensed current and to adjust a current supply to LED circuit 114.

Integrated circuit 602 is floating because the floating ground (F) moves between ground a second level voltage. Diodes D7 and D8 provide voltage across capacitors C4 and C6 respectively when the floating ground is on the ground level, which in turn store voltage and provide input signals on input lines 604 and 606 to floating integrated circuit 602.

It should be understood that first, second, and third reference voltages generated by floating integrated circuit 602 can be generated at any suitable levels. Specifically, second and third reference voltages are not limited to being twice and three-times the level of the first reference voltage. For example, a medium reference voltage may be twice the level of the low reference voltage, three times the level, four times the level, and so on. Likewise, the third reference voltage may be any suitable multiple of the first reference voltage.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of example aspects of the present disclosure thereof, and while the example aspects have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An LED driver circuit for providing three-way lighting control to an LED lamp to produce light at one of a low level, a medium level, and a high level, the LED driver circuit comprising:
    a rectifier circuit comprising a first input terminal coupled to a first AC voltage line and a second input terminal coupled to a second AC voltage line, wherein the rectifier circuit converts a first AC voltage on the first AC voltage line and a second AC voltage on the second AC voltage line to a DC voltage and the first AC voltage line and the second AC voltage line are both selectively controlled to be either on or off to provide the three-way lighting control to the LED lamp;
    an integrated floating circuit having a floating ground that switches between a ground and a second voltage level, the integrated floating circuit coupled to the first AC voltage line and to the second AC voltage line and generating a reference AC voltage based on the first AC voltage line and the second AC voltage line being on or off, wherein the reference voltage corresponds to one of the low level, the medium level, and the high level of light produced by the LED lamp, and wherein the integrated floating circuit provides a current to the LED lamp based on the generated AC reference voltage;
    a first diode connected to the first AC voltage line and the integrated floating circuit; and
    a second diode connected to the second AC voltage line and the integrated floating circuit, wherein if the first AC voltage line and the second AC voltage line are conducting and the floating ground is at the ground, then the first diode and the second diode are conducting and the floating integrated circuit generates the AC reference voltage at the low level.

2. The LED driver circuit of claim 1, wherein if only the first AC voltage line is conducting, then the floating integrated circuit generates the AC reference voltage at the medium level.

3. The LED driver circuit of claim 1, wherein if only the second AC voltage line is conducting, then the floating integrated circuit generates the AC reference voltage at the high level.

4. The LED driver circuit of claim 1, comprising a first capacitor in communication with the first diode and a second capacitor in communication with the second diode, and wherein if the floating ground is at the ground level, then the first diode and the second diode provide voltage across the first capacitor and the second capacitor respectively.

5. The LED driver circuit of claim 1, wherein the second AC reference voltage is substantially twice the voltage of the first AC reference voltage, and the third AC reference voltage is substantially three times the voltage of the first AC reference voltage.

6. The LED driver circuit of claim 1, comprising a neutral line.

7. The LED driver circuit of claim 6, wherein the rectifier includes a third input terminal coupled to the neutral line.

8. The LED driver circuit of claim 1, wherein the rectifier circuit is a combination of three half bridge diode circuits connected in parallel.

9. The LED driver circuit of claim 1, wherein the integrated floating circuit compares the AC reference voltage to a sensed current, and adjusts the current provided to the LED lamp based on the comparison.

10. A LED lamp for producing light at one of a low level, a medium level, and a high level, the LED lamp comprising:
  at least one LED; and
  an LED driver circuit for providing three-way lighting control to the at least one LED, the driver circuit comprising:
    a rectifier circuit comprising a first input terminal coupled to a first AC voltage line and a second input terminal coupled to a second AC voltage line, wherein the rectifier circuit converts a first AC voltage on the first AC voltage line and a second AC voltage on the second AC voltage line to a DC voltage and the first AC voltage line and the second AC voltage line are both selectively controlled to be either on or off to provide the three-way lighting control to the at least one LED;
    a first diode connected to the first AC voltage line and a second diode connected to the second AC voltage line; and
    an integrated floating circuit having a floating ground that switches between a ground and a second voltage level, the integrated floating circuit coupled to the first AC voltage line and to the second AC voltage line and generating a reference AC voltage based on the first AC voltage line and the second AC voltage line being on or off, wherein the reference voltage corresponds to one of the low level, the medium level, and the high level of light produced by the at least one LED, and wherein the integrated floating circuit provides a current to the at least one LED based on the generated AC reference voltage, wherein if the first AC voltage line and the second AC voltage line are conducting and if the floating ground is at the ground, then the first diode and the second diode are conducting and the floating integrated circuit generates the AC reference voltage at the low level.

* * * * *